United States Patent
Chen et al.

(10) Patent No.: US 11,206,236 B2
(45) Date of Patent: Dec. 21, 2021

(54) SYSTEMS AND METHODS TO PRIORITIZE CHAT ROOMS USING MACHINE LEARNING

(71) Applicant: Cisco Technology, Inc., San Jose, CA (US)

(72) Inventors: Eric Chen, Irvine, CA (US); Keith Griffin, Galway (IE)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/448,257

(22) Filed: Jun. 21, 2019

(65) Prior Publication Data
US 2020/0403955 A1  Dec. 24, 2020

(51) Int. Cl.
| | | |
|---|---|---|
| *G06N 20/00* | (2019.01) | |
| *H04L 29/08* | (2006.01) | |
| *H04L 12/58* | (2006.01) | |
| *G06F 3/0482* | (2013.01) | |

(52) U.S. Cl.
CPC ............ *H04L 51/32* (2013.01); *G06N 20/00* (2019.01); *H04L 67/306* (2013.01); *G06F 3/0482* (2013.01)

(58) Field of Classification Search
CPC ....... H04L 51/32; H04L 67/306; G06N 20/00; G06F 3/0482
See application file for complete search history.

(56) References Cited

U.S. PATENT DOCUMENTS

| | | | |
|---|---|---|---|
| 7,859,560 B1* | 12/2010 | Issa | H04L 12/1827 348/14.01 |
| 9,560,152 B1* | 1/2017 | Jamdar | H04L 67/22 |
| 10,142,279 B2 | 11/2018 | Ye | |
| 2006/0167944 A1* | 7/2006 | Baker | H04L 67/18 |
| 2010/0205541 A1* | 8/2010 | Rapaport | G06F 16/285 715/753 |
| 2012/0041792 A1* | 2/2012 | Priyadarshan | G06Q 30/0251 705/5 |
| 2014/0067842 A1* | 3/2014 | Chen | G06F 16/24 707/758 |
| 2014/0173430 A1* | 6/2014 | Clavel | G06F 3/0481 715/716 |
| 2014/0173467 A1* | 6/2014 | Clavel | H04L 12/1822 715/758 |
| 2015/0207765 A1* | 7/2015 | Brantingham | H04L 51/046 715/758 |
| 2016/0147387 A1 | 5/2016 | Rahman et al. | |
| 2016/0344673 A1* | 11/2016 | Abou Mahmoud | H04L 67/306 |
| 2016/0364368 A1 | 12/2016 | Chen et al. | |

(Continued)

*Primary Examiner* — Rupal Dharia
*Assistant Examiner* — Adam A Cooney
(74) *Attorney, Agent, or Firm* — Merchant & Gould P.C.

(57) ABSTRACT

Chat room content classification, in an online communication environment, where higher applicable chat rooms are prioritized for a user, is provided. First, an chat room service receives chat room content for at least a first chat room and a second chat room. A chat room analyzer can then analyze a characteristic(s) associated with the first chat room and/or the second chat room. Based on the characteristic, the chat room determines that the first chat room is more applicable to the user. Then, a user interface may be presented to the user where the first chat room is prioritized (or ranked) over the second chat room.

20 Claims, 12 Drawing Sheets

(56) References Cited

U.S. PATENT DOCUMENTS

| | | | |
|---|---|---|---|
| 2017/0185903 A1* | 6/2017 | Bernhardt | H04L 51/32 |
| 2018/0063061 A1* | 3/2018 | Tian | H04L 51/24 |
| 2018/0324133 A1 | 11/2018 | Costello et al. | |
| 2018/0367325 A1* | 12/2018 | Jang | H04L 51/20 |
| 2019/0019155 A1 | 1/2019 | Arora et al. | |
| 2019/0156210 A1* | 5/2019 | He | G06N 3/0481 |

* cited by examiner

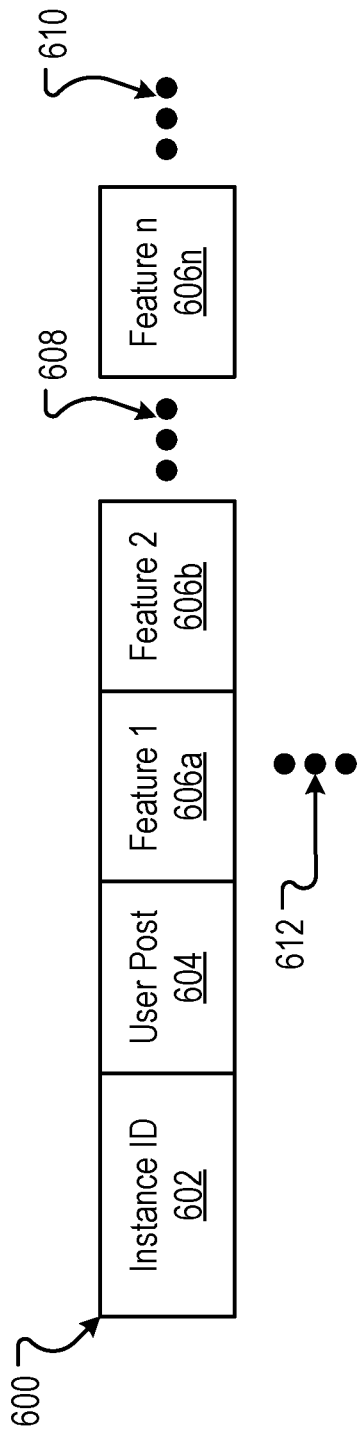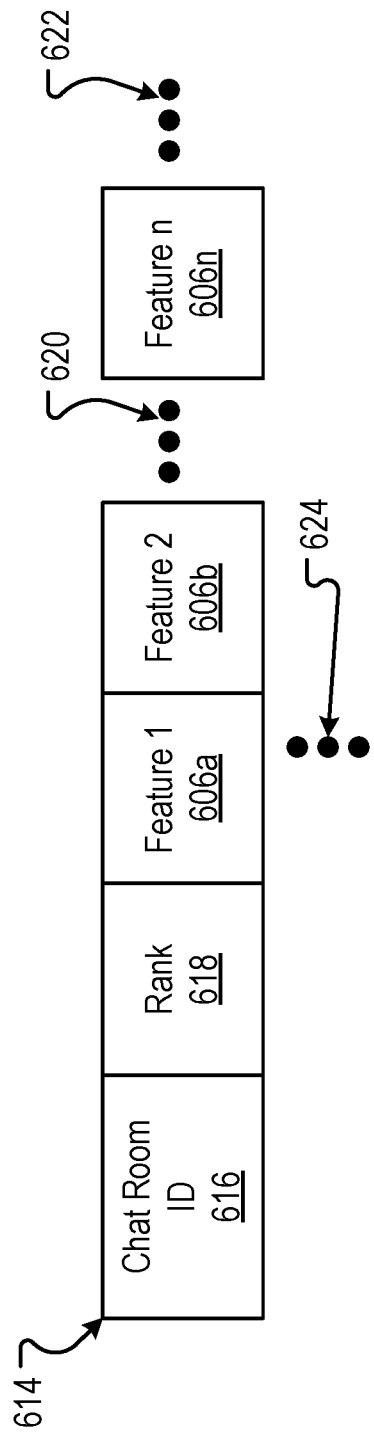

SYSTEMS AND METHODS TO PRIORITIZE CHAT ROOMS USING MACHINE LEARNING

TECHNICAL FIELD

The present disclosure relates generally to network-based communication applications and services executing over a computer network.

BACKGROUND

In an online communication session, for example a chat room discussion, the user can select a chat room in which to participate. The user may have to guess as to which chat room may be the most interesting. In some situations, the user may be provided with some summary of content or other data to make a determination as to which chat room may be interesting. Thus, the user may spend unnecessary time to determine which chat room to participate or may choose chat rooms that are not interesting, which can lead to user frustration.

BRIEF DESCRIPTION OF THE FIGURES

The accompanying drawings, which are incorporated in and constitute a part of this disclosure, illustrate various embodiments of the present disclosure. In the drawings:

FIG. 6A shows a data structure stored, sent, received, or retrieved to classify content in a chat room session in accordance with aspects of the present disclosure;

FIG. 6B shows another data structure stored, sent, received, or retrieved to classify content in a chat room session in accordance with aspects of the present disclosure;

DETAILED DESCRIPTION

Overview

Figure 1:
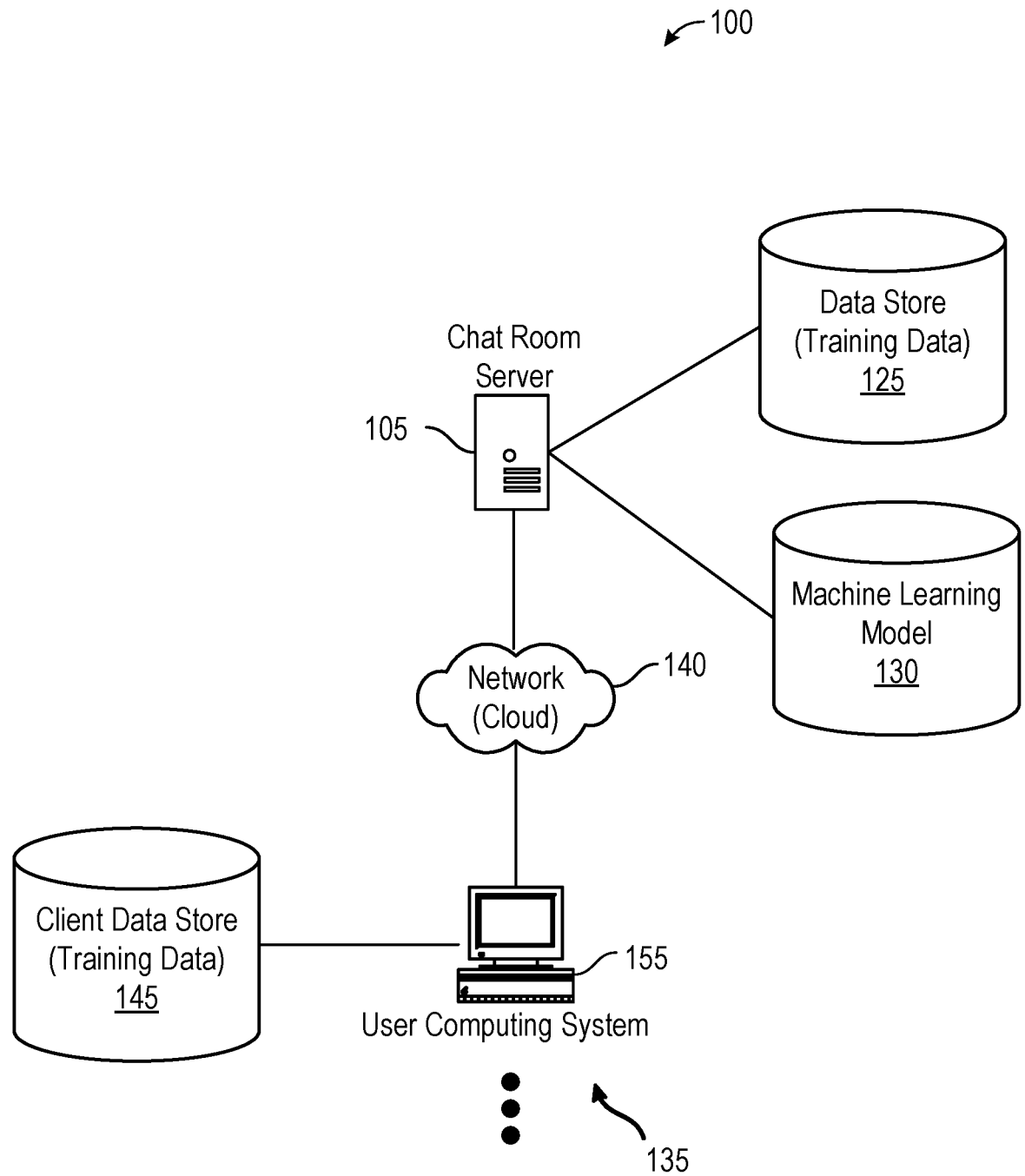
FIG. 1 shows an operating environment for classifying and/or ranking chat room content in online chat room sessions in accordance with aspects of the present disclosure.

Chat room content classification, in an online communication environment, where higher applicable chat rooms are prioritized for a user, is provided. First, a chat room service receives chat room content for at least a first chat room and a second chat room. A chat room analyzer can then analyze a characteristic(s) associated with the first chat room and/or the second chat room. Based on the characteristic, the chat room determines that the first chat room is more applicable to the user. Then, a user interface may be presented to the user where the first chat room is prioritized (or ranked) over the second chat room.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

To address the concerns above, and other limitations, a system and method for prioritizing chat rooms is provided. The system can have a least two components, a first component that can develop a Machine Learning (ML) model, and a second component that can provide a user feedback system to personalize the ML model for each user. To develop the ML model, a chat room can be analyzed as a non-persistent target, which can be parsed or separated into multiple instances or snapshots of the chat room. In one example, the chat room is parsed into instances based on the presence of the user's READ events.

In this example, each two adjacent READ events defines a snapshot, and the system can extract features from messages in each instance. In at least some configurations, the two READ events must be temporarily separated by some period of time (e.g. at least 1 hour) to be defined as a snapshot. Whenever a user posts a new message, the system can interpret the user's post as the user's interest in the latest snapshot and therefore can use the instance that includes a user post as a training label for supervised learning. In some circumstances, when using the user post as a training label, it may be possible that a user may post an entirely new message with no relevance to any prior unread messages. This situation can create an acceptable margin of error when training the model as these instances are often rare.

Alternatively or additionally, the instance can be defined by a period of time. For example, the system can also use each day as an instance, and can use all events that happen in one day as the features and users actions in that space as the label. However, using READ intervals to define the training label(s) can produce the best results that closely correspond to user's likelihood to post a new message immediately after recent events. With daily instances, there can be a weaker correlation between the daily events and the user actions, as this approach may capture irrelevant noise (e.g., non-influential posts) that were included only because those events are within the same time frame.

The features extracted through a client-side Application Programming Interface (API) can be used to train the ML model and can include one or more of, but is not limited to: user mentions, frequency of recent posts; files uploaded; a number of participants in the chat room; time delays between each user post; relationship(s) between the user and people who posted new messages (boss, colleagues, etc.); presence of important keywords to the user in new messages, etc. The model can predict the likelihood that a user will post a new message after reading the collection of unread messages. If the likelihood is high for a particular chat room, the high likelihood can be interpreted as important.

The second component of the system can be a feedback system. The feedback component can let each user begin with a pre-configured or generic model, and then personalize each model through user feedback. A user interface can be provided to the user, which can explain, to the user, why an unread space is predicted to be important, and can allow the user to modify the predictive model. The user interface can provide the chat rooms and may provide a visual indicia that indicates whether the space is important. Further, the user interface can also present the key factors or features that heavily influenced the prediction outcome for the important chat rooms. Using logistic regression, as an example, the initial ML model may include generic weights trained using data collected from a larger population. These weights influence how each feature affects the prediction outcome.

The user can be given the option to eliminate factors that the user thinks are less significant to himself. The original model may then be updated with different weights. This component can allow users to directly modify the trained models without understanding the algorithmic details. While not required from a feature perspective, the component can make the model more accurate and personalized. The user interface approach can be combined with behavioral analytics and can be reduced or removed over time based on measured personalization accuracy.

The components may be executed at the client or on a server. The client-side approach can have a number of advantages including: 1. user behavior occurs in the client and can be measured; 2. APIs may be readily available to allow access to the user's data in their authenticated session; 3. in the event that end-to-end encryption is used, the client APIs can comply with the end-to-end (e2e) model. Further, the system can benefit from user feedback in the initial phase. Over time, as the model matures, the ML model trainer can use behavioral analytics instrumented from the client side as a feedback mechanism, if the user feels the feedback is too much trouble.

FIG. 1 shows an operating environment 100 for classifying chat room content and ranking chat rooms providing two or more chat room sessions. A chat room session is an interaction that includes the sharing of comments or discussion between two or more users in a common environment or platform. As shown in FIG. 1, operating environment 100 may comprise a chat room server 105 and a network 140. The chat room server 105 can receive chat content streams from the various participants in the chat room session and mix or combine those chat data streams for presentation on the users' computers. Further, the chat room server 105 may collect information about a data stream, associated with an chat room session, sent from one or more user computing system(s) and/or device(s) 155, in a group of devices 135, involved in the chat room session. The chat data stream may be sent through a network 140.

The chat room server 105 can provide information about the classification of the content in the data stream and/or a ranking of available chat rooms back to the one or more user computing devices 155. The classification/ranking information can be used, by the one or more user computing devices 155, to provide a user interface to the user that ranks the available chat rooms for selection by a user. Chat room server 105 may be located inside or outside network 140, for example, in a cloud environment. The chat room server 105 can be any hardware and/or software, as described in conjunction with FIG. 9.

Network 140 may comprise, but is not limited to, an enterprise network and/or an outside network that may comprise an enterprise's communications backbone, the Internet, another local area network (LAN), another wide area network (WAN), or other network that may connect computers and related devices across departments and interconnect online collaboration workgroups, facilitating the sharing of information in an chat room session. A network 140 may comprise a router, an access point, a user device (e.g., device 155), or other components or systems. A plurality of end use devices 135 may be connected to one or more of the devices in the network 140. The network 140 can comprise any hardware device or configured node on a LAN, WAN, or other network that allows a devices to connect through a communication standard. The devices in the network 140 can feature a processor, radio transmitters, and antennae, which facilitate connectivity between devices 155 and the network 140. The devices in the network 140 can be as described in conjunction with FIG. 9.

User devices 155 may comprise, but are not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 140. The user devices 155 can be any hardware and/or software, as described in conjunction with FIG. 9.

The data stores 125, 130, and/or 145 can be any type of data store, database, file system, and/or memory or storage. The data stores 125, 130, and/or 145 can store, manage, retrieve, etc. data associated with analyzing the chat data streams during a chat room session, producing a machine learning model for ranking chat rooms. The data stores 125, 130, and/or 145 may be hardware and/or software associated with the chat room server 105, the user device 155, or associated with another separate system as described in conjunction with FIG. 9. Regardless, the data stores 125, 130, and/or 145 may include at least a portion of the data described in conjunction with FIGS. 6A through 6C.

The elements described above, of operating environment 100 (e.g., chat room server 105, data stores 125, 130, and/or 145, end user device 155, etc.), may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 9, the elements of operating environment 100 may be practiced in a computing device 900.

Consistent with embodiments of the disclosure, the user device 155 may be in communication over the network 140 to the chat room server 105 to send or receive a data stream associated with one or more chat room sessions. The chat room server 105 can receive the data streams from two or more user devices 155 during the chat room session or sessions. To provide a better user experienced, it is desired to provide a ranking of available chat rooms, which can change over time due to changes in the content of the chat rooms over time, that allows the user to select a most applicable or desirable chat room. Hereinafter, provided in greater detail below, the process of classifying the chat room content and the raking of the chat rooms on the classification is further described.

Figure 2A:
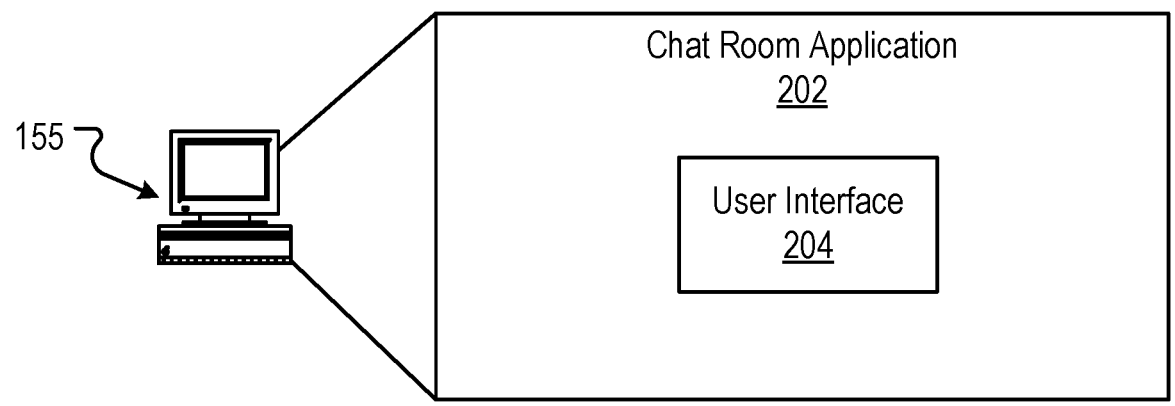
FIG. 2A shows an example of user device that may be executing a chat room application in accordance with aspects of the present disclosure.

FIG. 2A shows an example of a user device 155. The user device 155 can include at least a client-side portion of the chat room software, embodies as a chat room application 202. The chat room application 202 can provide the interface between the user and the chat room service 208 (described hereinafter) executed on the chat room server 105. Thus, the chat room application 202 receives the inputs and data from the client-side of the chat room session and provides that data to the chat room server 105. Likewise, the chat room application 202 receives the inbound data stream from the chat room server 105 and presents that data to the user. In at least some configurations, the chat room application 202 comprises at least a user interface 204.

The user interface 204 provides the inbound data to the user. Thus, the user interface 204 can display any chat room data (e.g., comments or discussion from other users, available chat rooms, information about how the chat rooms are ranked or prioritized, etc.) to a display device. Likewise, the user interface 204 can also receive data from the user or the user device 155. For example, the user interface 204 can receive chat room input, for example, posts to a chat room, to provide as an output data stream. The outbound data stream may be sent to the chat room server 105.

Figure 2B:
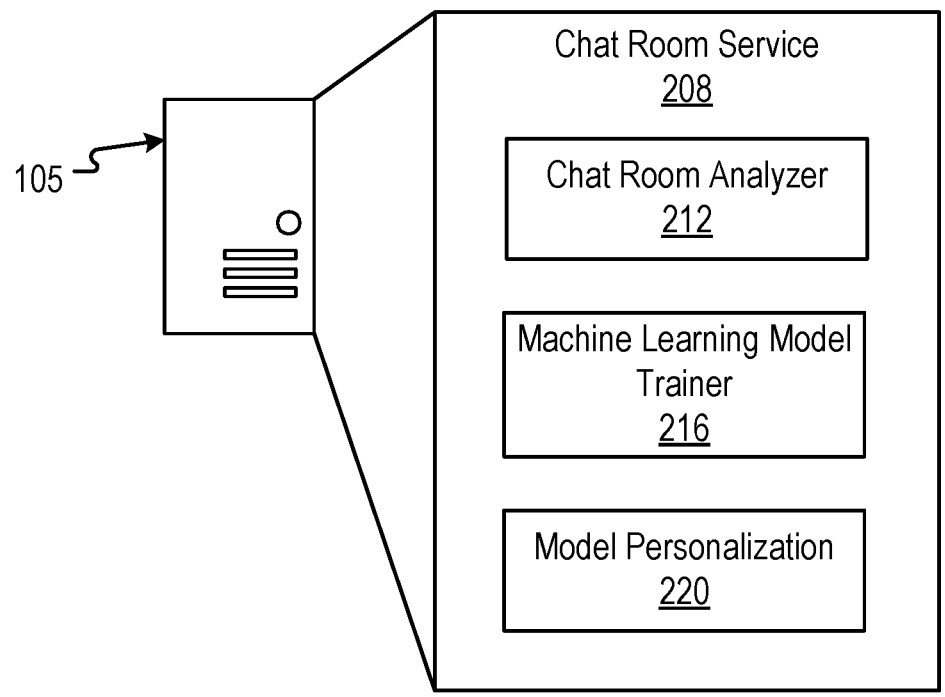
FIG. 2B shows an example of a server that may be executing a chat room service in accordance with aspects of the present disclosure.

An exemplary embodiment of the chat room server 105 may be as shown in FIG. 2B. The chat room server 105 can include at least a second portion or the chat room software, embodied as a chat room service 208. The chat room service 208 can be any software and/or hardware that provides the chat room session. Thus, the chat room service 208 can mix the various data streams provided from the two or more user devices 155 involved in the chat room session(s) and send the mixed content to the two or more user devices 155. Thus, the chat room service 208 manages numerous inbound and outbound data streams. In at least some configurations, the chat room service 208 can analyze the chat room data content to prioritize or rank the chat rooms. The chat room service 208 can include one or more of, but is not limited to, a chat room analyzer 212, a Machine Learning (ML) model trainer 216, and/or a model personalization component 220.

The chat room analyzer 212 can analyze the chat room data content, for one or more chat rooms and from the two or more user devices 155 involved in the chat room session (s). This analysis can include characterizing the content based on one or more characteristics associated with the chat room signals, the chat room content, etc. being received and sent. Based on this analysis, the chat room analyzer 212 can determine classification information associated with a user and/or user profile regarding how the chat rooms should be prioritized or ranked. Hereinafter, the process of analyzing the chat room data content will be described in more detail.

The ML model trainer 216 can analyze past and contemporaneous chat room data and metadata, for one or more chat rooms, associated with a user involved in the chat room session(s). The training of the ML model can include characterizing the content and/or metadata associated with the chat rooms and the data streams (as may be stored in databases 145 and/or 125) based on one or more characteristics associated with the chat room signals, the chat room content, metadata, etc. as were received and sent and/or associated with the chat rooms. Based on this analysis, the ML model trainer 216 can create a user profile, which can include an algorithm, that can prioritize or rank chat rooms based on possible preference of the user. Hereinafter, the process of generating the user profile to rank or prioritize the chat rooms will be described in more detail.

The model personalization component 220 can provide information about the user profile to the user. This information can include algorithm information or other user profile information. Further, the user profile information can be sent to the chat room application 202. The chat room application 202 may then render the user profile information for the user to provide input to change the user profile. The input may then be sent to the model personalization component 220 to modify the user profile according to the desires of the user. Hereinafter, the process of personalizing the user profile will be described in more detail. It should be noted that the chat room analyzer 212, ML model trainer 216, and/0r model personalization component 220 is shown as executed on the server 105. However, in at least some configurations, a portion or all of the chat room analyzer 212, ML model trainer 216, and/or model personalization component 220 can be executed on the user device 155 instead. Thus, the description hereinafter should be read as having the processes being executed on the chat room server 105 and/or the user device 155.

Figure 3A:
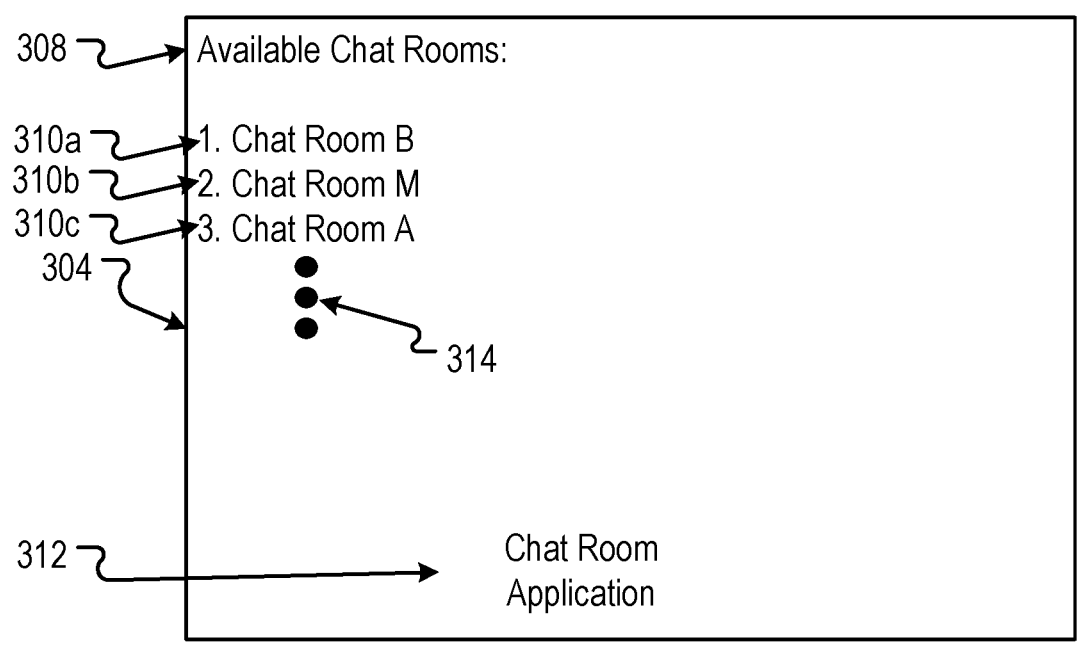
FIG. 3A shows an example user interface having ranked chat rooms presented to the user in accordance with aspects of the present disclosure.

An example of a user interface 304 and the concomitant data associated therewith may be a shown in FIG. 3A. The user interface display 304 can be for a chat room application 202. This chat room application 202 may provide, as output, the user interface 204 to the user. In the user interface display 304, the chat room application 202 may include chat rooms list 308. The chat rooms 310a, 310b, and 310c may be listed for selection by a user with a user interface device. As shown, the chat rooms 310 are ranked or ordered from a first-ranked chat room B 310a to a last-ranked chat room A 310c. There may be more or fewer chat rooms 310 listed, as represented by ellipses 314. The highest listed chat room 310a may, thus, be prioritized above the other chat rooms. The listing 308 can change over time based on changes in the control in the chat rooms.

Figure 3B:
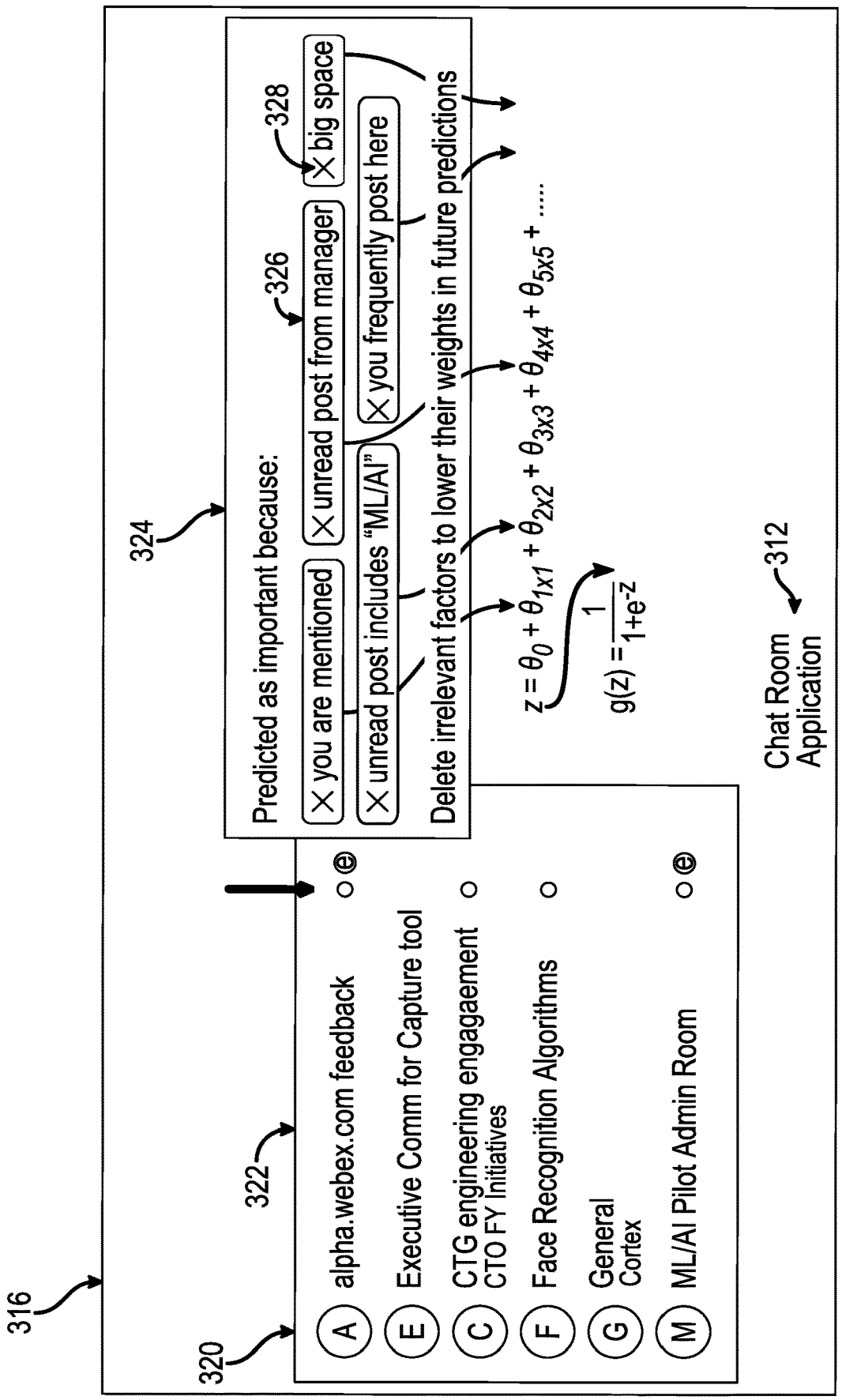
FIG. 3B shows another example user interface allowing a user to customize the user profile used to rank chat rooms presented to the user in accordance with aspects of the present disclosure.

An example of another user interface 316 may be as shown in FIG. 3B. The user interface 316 can also be provided by the chat room application 202 for customizing the user profile used to prioritize the listing of chat rooms 308 in FIG. 3A. The user interface 316 can include a selection of configuration settings, shown in user interface portion 320. The selection to change the user profile may include selection 322, which when selected, can cause the user interface 316 to provide the user profile user interface 324. In user profile user interface 324, the user profile may include a list of characteristics that may be part of the user profile. The user may then select one or more of the user interface selections 326 to eliminate the characteristics by selecting the user interface device 328. In other configurations, the user may add characteristics, change the weightings applied to one or more of the characteristics, or conduct other changes to the user profile.

Figure 4:
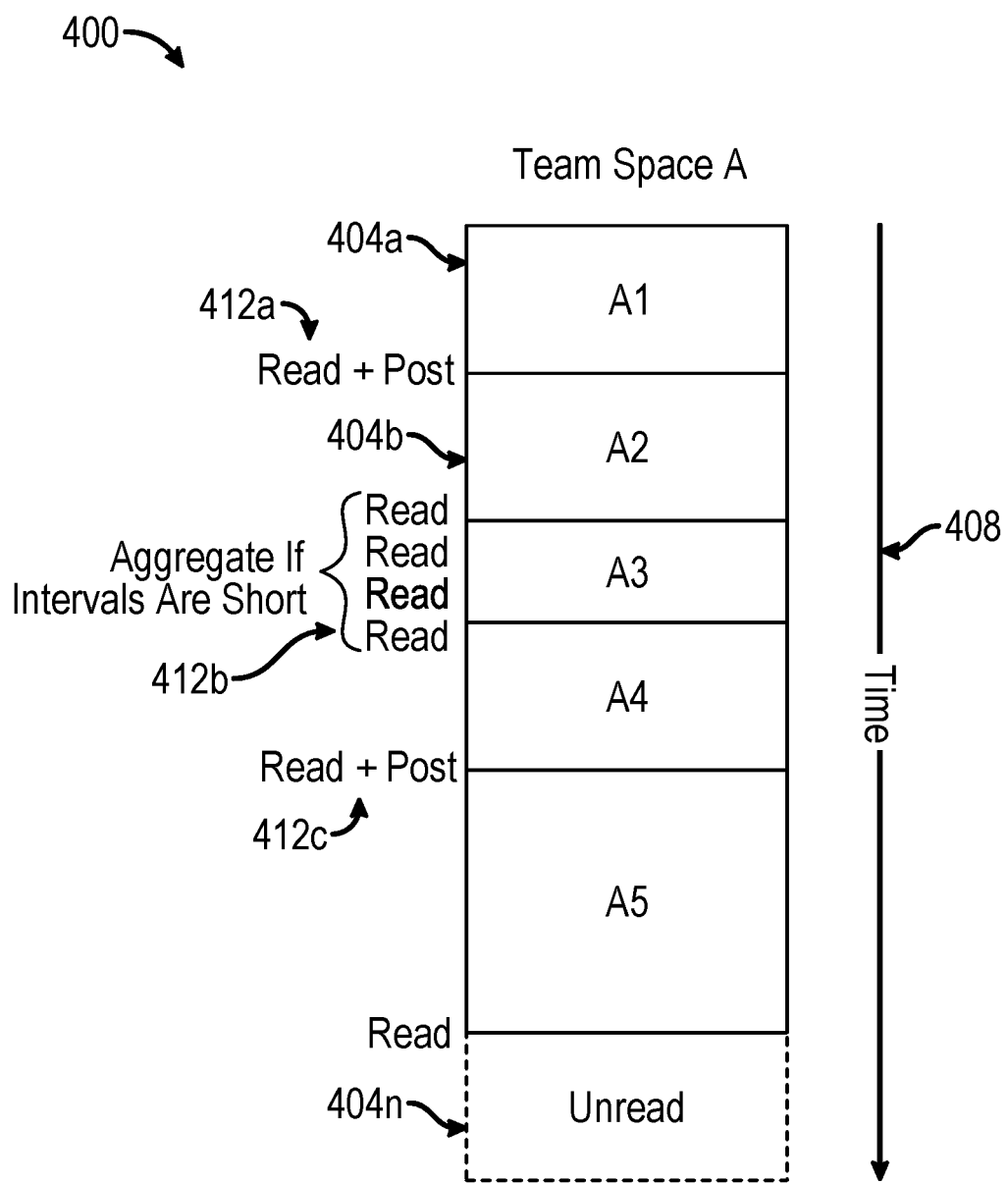
FIG. 4 shows an example of a process for parsing of chat room content in accordance with aspects of the present disclosure.

An example of a processing applied to chat room data may be as shown in FIG. 4. Data associated with a chat room is dynamic, meaning the data changes as more posts are made to the chat room. Thus, the chat room data can be analyzed continuously or persistently to continually update how the chat room(s) are prioritized. Further, the following analysis may also occur when training the ML model.

First, the stream of chat room data may be separated into two or more instances 404a, 404b, 404n covering a period of time 408. There may be more or fewer instances 404 than those shown in FIG. 4. The start and/or stop time for the instances 404 may be determined by one or more rules. For example, each instance may need to be at least some amount of time, for example, 30 minutes, an hour, etc. However, an instance may be started or stopped by an event 412a, 412b, and/or 412c, for example, the user reads a post in the chat room, the user posts a reply in a chat room, etc. In some circumstances, a series of events 412b that are within temporal proximity, e.g., are less than 10 minutes apart, may be grouped into a single instance. Each instance can then be evaluated to determine one or more features or characteristics of that instance. Based on the user action(s) in the instance, the features of that instance 404 may have more or less weight. For example, a user posting a reply will have more influence on the algorithm than instances without a reply.

Figure 5:
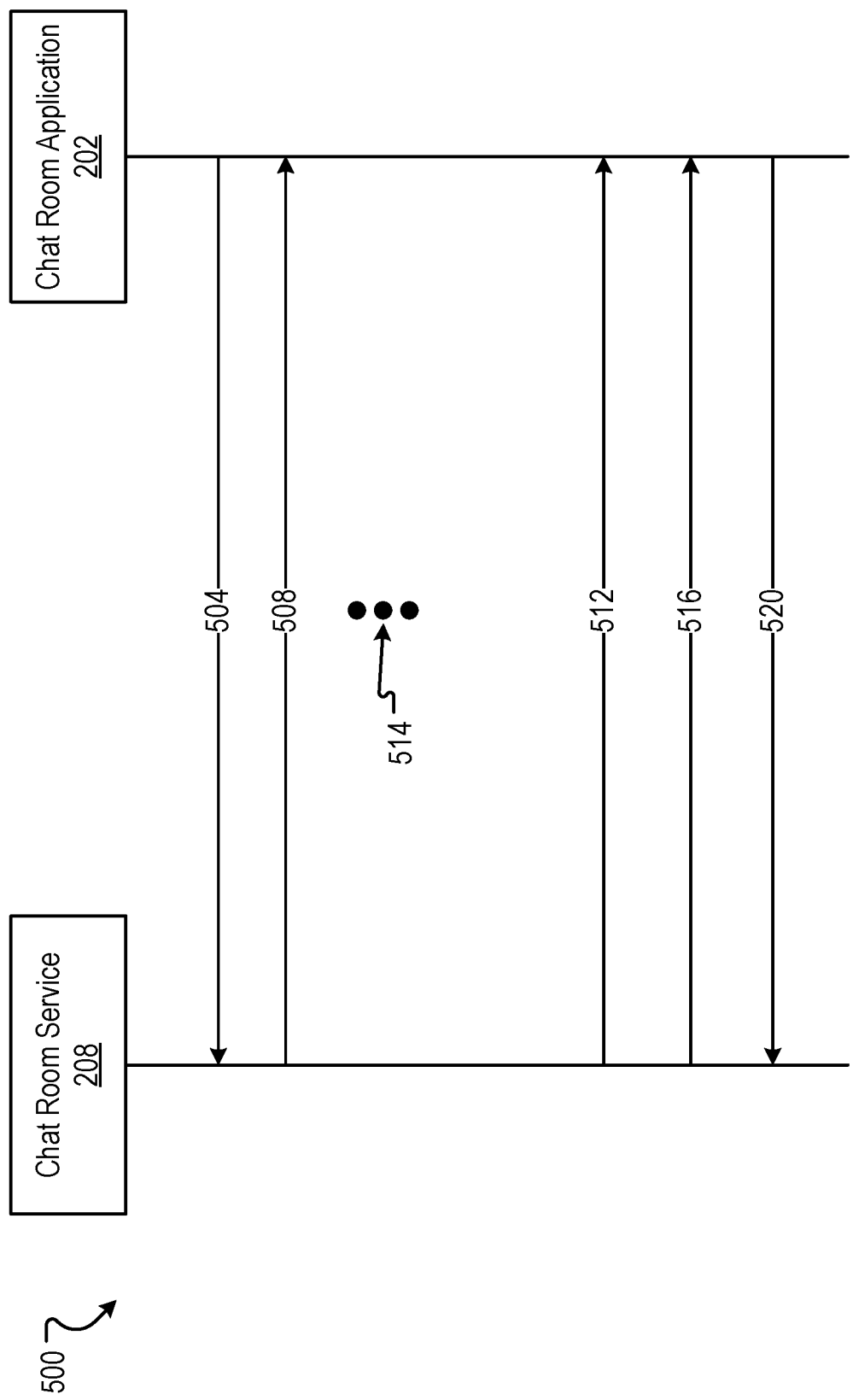
FIG. 5 shows a signaling diagram in accordance with aspects of the present disclosure.

FIG. 5 is a signalling diagram 500 that shows a least some of the communications between the user device 155 and the chat room server 105. The signals may be sent in various stages to provide the chat room session and to determine the content within the data stream sent from the user device 155 to the chat room server 105. The chat room application 202 of the user device 155 can send the data stream in signal 504. This initial signal or data stream 504 can include an initial selection of a chat room which may be used to provide an indication of what chat data is to be sent to the chat room application 202.

The chat room service 208 may then send chat room data, in signal 508. The chat room service 208 can also mix the various inputs from the various chat room participants for distribution to the user devices 155. These data streams between the chat room service 208 and the chat room application 202 can continue, as represented by ellipses 514. These data streams 504, 508 can be analyzed to train the user profile algorithm and/or determine the chat room prioritization. The chat room prioritization may be sent after the analysis as signal 512. The analysis processes may be as described in FIGS. 7A-8. In further configurations, the chat room service 208 can send the user profile to the chat room application 202, in signal 516. This allows the chat room application 202 to receive changes to the user profile and send those changes back to the chat room service, as signal 520.

FIG. 6A is a data structure 600 that may be an example of the data included in signal 504 or signal 508 and contained in instances 404. The data structure 600 can include one or more of, but is not limited to, an instance Identifier (ID) 602, a user post 604, and/or one or more characteristics (also referred to as features) 606a, 606b, 606n. The data structure 600 can include more or fewer fields than those shown in FIG. 6A, as represented by ellipses 610. Further, each chat room session can send a data structure 600, and thus, there may be more data structures provided than that shown in FIG. 6A, as represented by ellipses 612.

The instance ID 602 can represent any type of identifier that uniquely identifies the instance 404 in the chat room session. Thus, the instance ID 602 can be a numeric ID, an alphanumeric ID, a Globally Unique Identifier (GUID), or some other ID used by the chat room server 105 to the identify an instance 404 in a chat room session.

The user post 604 may be a setting or indication that the user had made a reply or provided a posting in the instance 404. Thus, the indication may be a single bit indication. In other configurations, other data may be associated with the user post 604, for example, the length of the post, the timing of a post compared to another message in the chat room, etc.

The feature or characteristic 606 can include any data, associated with the chat room session, that characterizes the content or metadata of the instance 404. The features 606 can include user mentions, frequency of recent posts, files uploaded, a number of participants in the chat room, time deltas between each user post, a relationship between the user and people who posted new messages (e.g., a boss, colleagues, etc.), presence of important keywords to the user in new messages, etc. These features can indicate which instances are more important to the user and would represent future content of interest to the user. There may be more or fewer features 606 than those shown in FIG. 6A, as represented by ellipses 608.

FIG. 6B is another data structure 614 that may be an example of the data included in signal 512. The data structure 614 can include one or more of, but is not limited to, a chat room ID 616, a rank, and/or one or more features 606a-606n. The data structure 614 can include more or fewer fields than those shown in FIG. 6B, as represented by ellipses 622. Further, each chat room, having a chat room session, can have a data structure 614, and thus, there may be more data structures provided than that shown in FIG. 6B, as represented by ellipses 624. Still further, there may be more or fewer features 606 than those shown in FIG. 6B, a represented by ellipses 620. The features 606 may be as previously described with data structure 600, and thus, will not be explained further.

The chat room ID 616 can represent any type of identifier that uniquely identifies the chat room for the chat room application 202 and/or chat room services 208. Thus, the chat room ID 616 can be a numeric ID, and alphanumeric ID, a GUID, or some other ID used by the chat room server 105 to the identify an instance of a chat room.

The rank 618 can be a unique rank or prioritization of the chat room identified by the chat room ID 616. Thus, the rank 618 can be from 1 to n, where n is the number of chat rooms associated with the user and/or chat room application 202. The rank 618 allows the chat room application 202 to order the chat rooms in user interface 304.

Figure 6C:
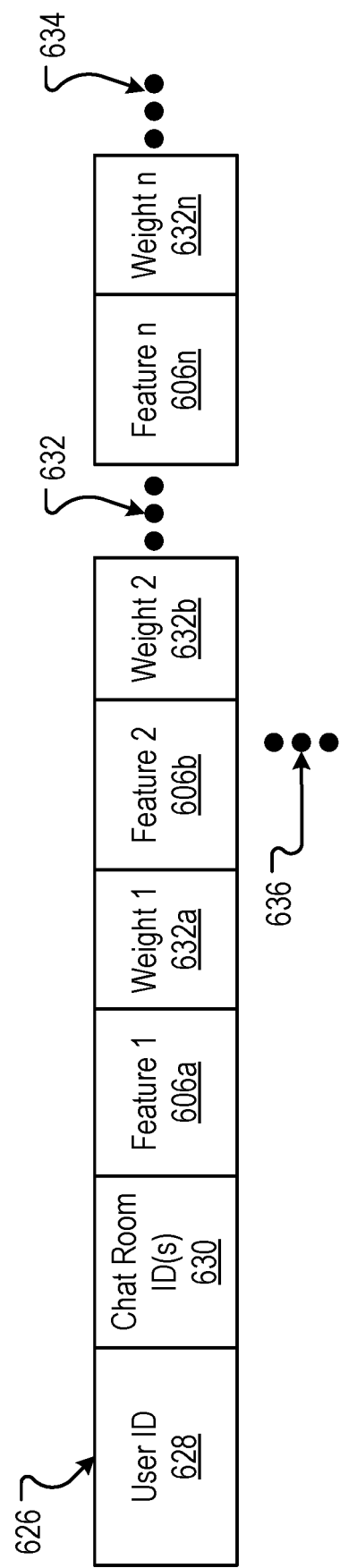
FIG. 6C shows another data structure stored, sent, received, or retrieved to classify content in a chat room session in accordance with aspects of the present disclosure.

FIG. 6C is another data structure 626 that may be an example of the user profile. The data structure 626 can include one or more of, but is not limited to, a user id 628, chat room IDs 630, one or more features 606a-606n, and one or more associated weights 632a, 632b, 632n. The algorithm represented by features 606 and weights 632 may have more or fewer elements than that shown in FIG. 6C, as represented by ellipses 632. The data structure 626 can include more or fewer fields than those shown in FIG. 6C, as represented by ellipses 634. Further, each user or user device 155 involved in one or more chat room sessions can have a data structure 626, and thus, there may be more data structures provided than that shown in FIG. 6C, as represented by ellipses 636. Still further, there may be more or fewer features 606 and associated weights 632 than those shown in FIG. 6C, a represented by ellipses 636. The features 606 may be as previously described with data structure 600, and thus, will not be explained further. The chat room IDs 630 can be a listing of the chat rooms, identified by chat room ID 616, accessible and associated with the user, identified by user ID 628. As such, the chat room IDs 630 may be as previously described with data structure 614, and thus, will not be explained further.

The user ID 628 can represent any type of identifier that uniquely identifies the user and/or user device 155 in the chat room application 202 and/or chat room service 208. Thus, the user ID 628 can be a numeric ID, and alphanumeric ID, a GUID, a uniform resource locator (URL), an address, or some other ID used by the chat room server 105 to the identify the user and/or user device 155.

The weight 632 can be a numeric value assigned to each feature 606 that indicates the amount of influence or weight the feature has on determining the rank of the chat room. The weight 632 may be determined through statistical analysis of past chat room data and developed by the ML model trainer 216. The weight 632 can be a decimal value representing a portion of a value, e.g., one (1). When all the weights 632a-632n are summed, the total equals the value. The weight 632 may be determined through regression analysis or other statistical computation.

Figure 7A:
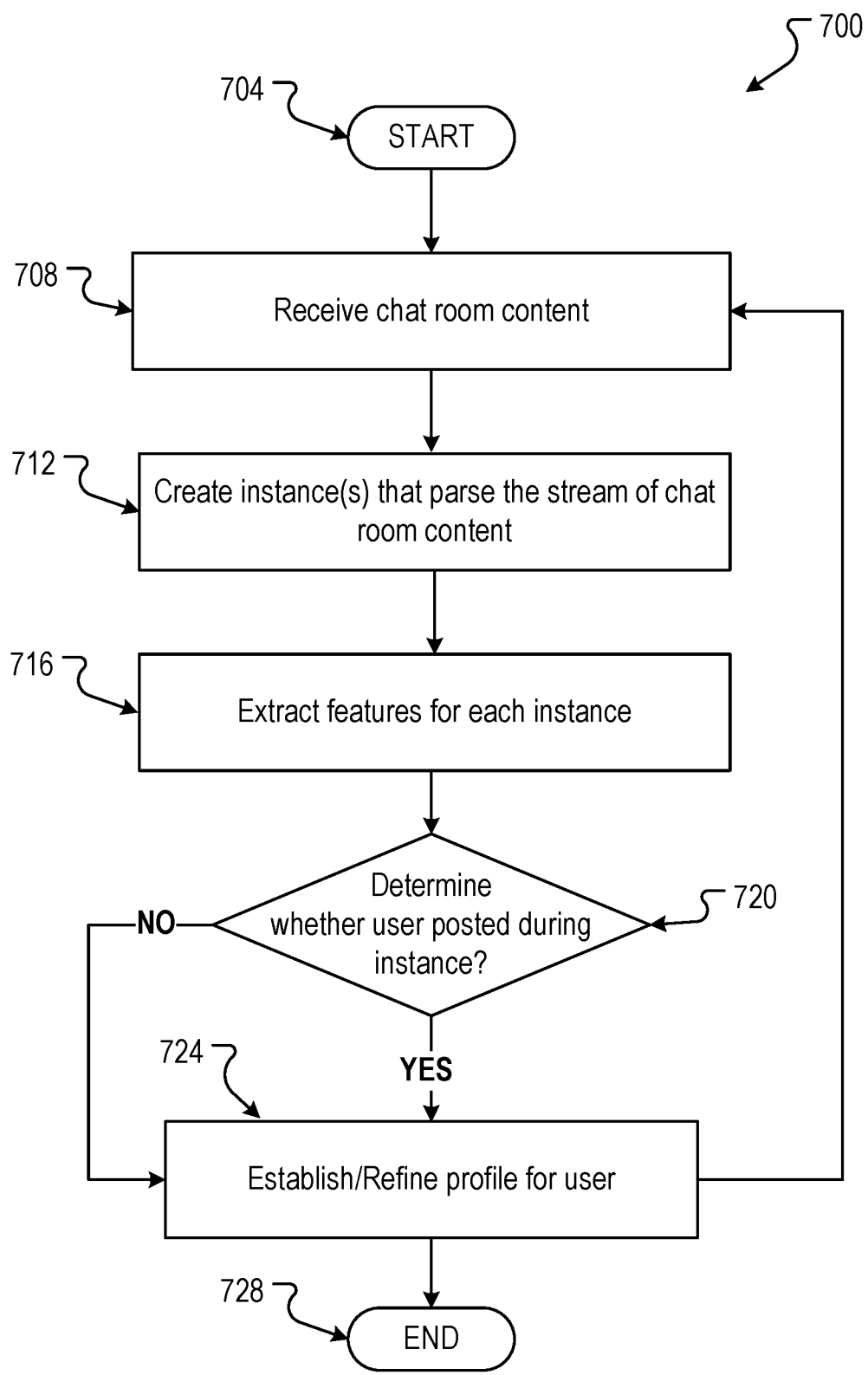
FIG. 7A shows a method, conducted by the chat room application and/or the chat room service, for classifying chat room content in accordance with aspects of the present disclosure.

An embodiment of a method 700, as conducted by the chat room service 208 and/or the chat room application 202, for establishing the user profile 626 may be as shown in FIG. 7A. A general order for the stages of the method 700 is shown in FIG. 7A. Generally, the method 700 starts with a start operation 704 and ends with an end operation 728. The method 700 can include more or fewer stages or can arrange the order of the stages differently than those shown in FIG. 7A. The method 700 can be executed as a set of computer-executable instructions executed by a computer system and encoded or stored on a computer readable medium. Further, the method 700 can be performed by gates or circuits associated with a processor, an Application Specific Integrated Circuit (ASIC), a Field Programmable Gate Array (FPGA), a System-On-Chip (SOC), or other hardware device. Hereinafter, the method 700 shall be explained with reference to the systems, components, devices, modules, software, data structures, user interfaces, signalling diagrams, methods, etc. described in conjunction with FIGS. 1-6C and 7B-9.

The chat room application 202, of the user device 155, can begin a chat room session with the chat room service 208, in stage 708. Thus, the chat room application 202 receives user input through the user interface 204 to connect to the chat room service 208 and with one or more other user devices 155 in a group of devices 135. The chat room application 202 can present two or more chat rooms for the user to access and from which to receive content. The chat room application 202 may then generate the user interface 204 for the chat room session. The user may then provide content to be shared in the chat room session. The indicated content is then provided and/or received, as chat room content.

The chat room service 208 and/or the chat room application 202 may analyze the chat room content for the two or more chat rooms. First, the chat room application 202 and/or the chat room service 208 can parse the content from the two more chat rooms into instances 404 as shown in FIG. 4, in stage 712. Thus, the chat room application 202 and/or the chat room service 208 can separate a period of time 408 for a late into one or more instances 404. The instances 404 may be bounded by some event, for example a read event or a post event from the user, which indicates a start or stop time for the instance 404. These events 412 can indicate the boundaries of the instances 404. Additionally or alternatively, the instances 404 may be bounded by an amount of time, for example, one hour, 30 minutes, etc. The instances 404 may then be evaluated thereinafter to determine the features 606 associated with each instance 404a through 404N.

The chat room application 202 and/or the chat room service 208 can then extract features 606 for each instance 404, in stage 716. The features can include the one or more features 606 as described in conjunction with FIG. 6A. As such, the chat room application 202 and/or the chat room service 208 may create data structure 600. The chat room application 202 and/or the chat room service 208 can extract features 606, such as a keyword in the chat room, the relationship between the user and a poster in the chat room, the time proximity of multiple postings in the chat room, how soon before the present time, a post has been made, the number of postings, the intent or other types of information about the postings, other metadata about the postings, or other data in general. These features may be stored in data structure 600 as feature 606a through 606n. The features 606 may be associated with the instance 404 by storing the feature 606 with an instance ID 602 in the data structure 600.

The chat room application 202 and/or these chat room service 208 may then determine whether users posted during that instance 404. For example, in instances 408a and 408c, shown in FIG. 4, the user has made a posting to that chat room. If such a posting has been made, an indication that a posting has been made in that instance 404 may be stored in data field 604. The user posting data field 604 indicates to the ML model trainer 216 that that instance is more important than other instances 404. Regardless of whether the user has posted during that chat room instance or not the method 700 may proceed YES or NO to stage 724 to establish or refine the profile for the user.

Based on the features extracted from the instance(s) 404, the ML model trainer 216 may then create the user profile 626. Based on analysis of the features 606 and other information regarding the instances 404, the ML model trainer 216 can assign a weight 632 to each of the different features 606. The weights 632 and features 606 can then be stored in data structure 626 and associated with user by storing user ID 628 into the data structure 626. The various chat rooms that are accessible or viewable by the user may also be listed in the chat room ID portion 630. The data structure 626 then represents the user profile that may be used to rank the chat rooms in future sessions when the user accesses the chat room service 208. In at least some configurations, the user profiles can be continually updated by the ML model trainer 216. As such, the process 700 may proceed from stage 724 back to stage 708 to repeat the process and to refine the user profile 626.

The user profile 626 may include an algorithm to determine the current applicability of the chat room to the user. The algorithm may be as follows:

$$\theta_0 + \theta_1 x_1 + \theta_2 x_2 + \theta_3 x_3 \ldots \theta_n x_n = z$$

In the above, $\Theta$ represents the weight of the feature, x is the feature, and z (the sum of the weights and features) represents the importance of the chat room or chat room instance. The value of z for each chat room can be compared and used to rank the chat rooms from highest value of z to lowest value of z.

Figure 7B:
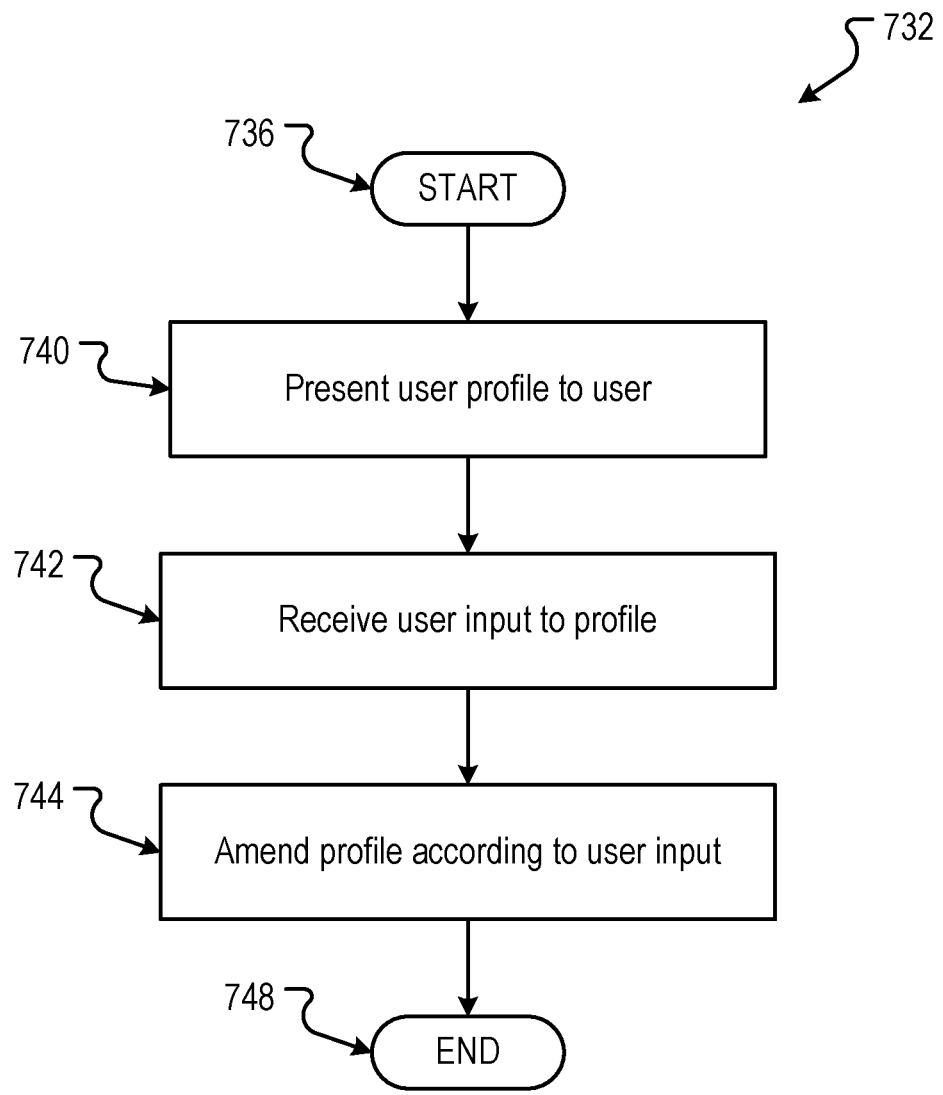
FIG. 7B shows a method, conducted by the chat room application and/or the chat room service, for receiving user input into how to classify chat room content in accordance with aspects of the present disclosure.

An embodiment of a method 732, as conducted by the model personalization component 220, for allowing a user to customize the user profile 626 may be as shown in FIG. 7B. A general order for the stages of the method 732 is shown in FIG. 7B. Generally, the method 732 starts with a start operation 736 and ends with an end operation 748. The method 732 can include more or fewer stages or can arrange the order of the stages differently than those shown in FIG. 7B. The method 732 can be executed as a set of computer-executable instructions executed by a computer system and encoded or stored on a computer readable medium. Further, the method 732 can be performed by gates or circuits associated with a processor, an ASIC, a FPGA, a SOC, or other hardware device. Hereinafter, the method 732 shall be explained with reference to the systems, components, devices, modules, software, data structures, user interfaces, signalling diagrams, methods, etc. described in conjunction with FIGS. 1-7A and 8-9.

The model personalization component 220 can present the user profile to user, in stage 740. The model personalization component 220 can retrieve the data for the user profile from the ML model data store 130. The user profile data structure 626 can be formed into a message by the chat room server 105 and sent to the computing system 155, as signal 516. In other configurations, the user computer system 155 may store the user profile data 626 in data store 145 and retrieve that data structure 626 from the local data store 145.

As an example, the user interface 204 of the chat room service 208 provides a first user interface 324 listing options that are customizable. The user may input a selection into an user selectable option 326, which allows the user to change or modify the user profile in user interface 324. Based on the user input into user interface 324, the chat room application 202 can provide the user profile user interface 324 to the display of the user computer 155. The display of the user profile user interface 324 can include one or more of the features 606 displayed as user selectable options 326.

The user may then manage the formation or configuration of the user profile 626 by eliminating one or more of the features 606. For example, the user may select user interface device 328 to eliminate one of the features 326. This user interface may allow the user to eliminate the feature 606 from the user profile 626. The chat room application 202 may then receive the user input to the user profile 626, in stage 742. The user input can be sent from the chat room application 202 back to the chat room service 208, as signal 520. The model personalization component 220 may then store or amend the user profile 626 to reflect the change received from the user, in stage 744. Thus, the model personalization component 220 can store the changes to the user profile 626 into the ML model data store 130.

In other circumstances, the user may change the user profile 626 by other methods in addition to or alternatively to eliminating one or more of the feature 606. For example, the user may be able to add another feature through the user interface 324. Still in other configurations, the user may be able to change the weighting 632 of one or more of the feature 606 to change how the algorithm for the user profile is computed. Other changes from the user may also be possible.

Figure 8:
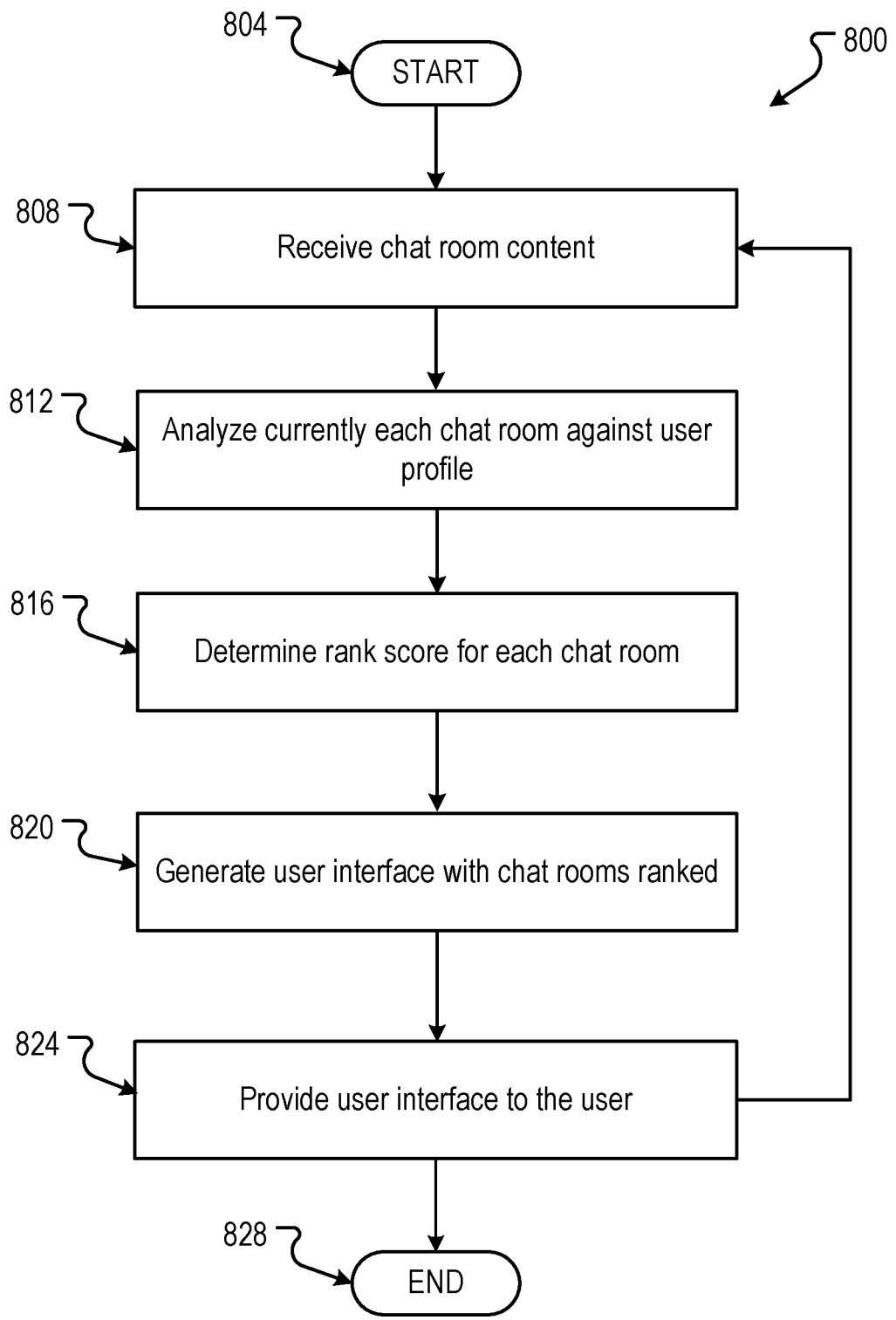
FIG. 8 shows a method, conducted by the chat room application and/or the chat room service, for ranking chat rooms in accordance with aspects of the present disclosure.

An embodiment of a method 800, as conducted by a chat room server 105, for ranking or prioritizing chat rooms may be as shown in FIG. 8. A general order for the stages of the method 800 is shown in FIG. 8. Generally, the method 800 starts with a start operation 804 and ends with an end operation 828. The method 800 can include more or fewer stages or can arrange the order of the stages differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, a FPGA, a SOC, or other hardware device. Hereinafter, the method 800 shall be explained with reference to the systems, components, devices, modules, software, data structures, data characteristic representations, signalling diagrams, methods, etc. described in conjunction with FIGS. 1-7B and 9.

The chat room analyzer 212 can receive chat room content, in stage 808. Thus, the chat room server 105 and a group of user computer systems 135 can begin or continue a chat room session. The chat room session can include chat content sent, in signal 504, to the chat room service 208. The chat room service 208 can combine the various inputs from the chat room application(s) 202 of the user computer group 135 into signal 508 sent to each of the user computers 135. The signal 508 may then be received by the chat room analyzer 212. There can be two or more chat room sessions being conducted for the user computer 155. Each of the signals 508 associated with each of the two or more chat room sessions can be received by the chat room analyzer 212.

The chat room analyzer 212 can analyze the current state of each chat room against a user profile 626, in stage 812. Thus, the chat room analyzer 212 can analyze some period of time 408 into the past from the current time. The analysis can include parsing the period of time into one or more instances 404. Each of the instances 404 can have their content compared to the user profile 626. In other configurations, the chat room analyzer 212 may not parse the period of time into two or more instances, but may analyze the content in the period of time as a single collection of data. Each feature 606 present in the chat room data may be identified. The number of occurences of the feature(s) 606 may be identified.

This information may then be inserted into the algorithm of the user profile by the chat room analyzer 212. Each of the weights 632 may be applied to the feature(s) 606. The chat room analyzer 212 may then solve the algorithm by finding the product of each feature 606 and weight 632. These products may then be summed to determine a score for that chat room. The chat room analyzer 212 can use different types of algorithms than that shown herein, which may be possible in the aspects disclosed herein. Regardless of what type of algorithm is used, the chat room analyzer can use an algorithm to determine a rank score for each chat room, in stage 816. The chat room analyzer 212 can then form data structure 614 and insert the rank 618 determined by the algorithm into the data structure 614 for each chat room identified by chat room ID 616.

From the information, in data structures 614, for each of the chat rooms, the chat room analyzer 212 may then generate a user interface 304 with chat rooms ranked, in stage 820. As shown in FIG. 3A, the two or more chat rooms 310a through 310c can be ordered or prioritize from top to bottom based on the ranking. For example, a first chat room A 310c may be ranked third while a second chat room, chat room B 310b, may be ranked first.

This user interface 304 or the data required to render the user interface 304, may be sent by the chat room analyzer 212 back to the chat room application 202, as signal 512, to be provided by the user interface 204 to the user, in stage 824. Thus, the user interface 204 can render the user interface 304 to the display of the user computer 155. The user may then have the ability to view the rankings or prioritization of the chat rooms 310a through 310c. The user may also select one or more the chat rooms 310 based on this ranking.

Figure 9:
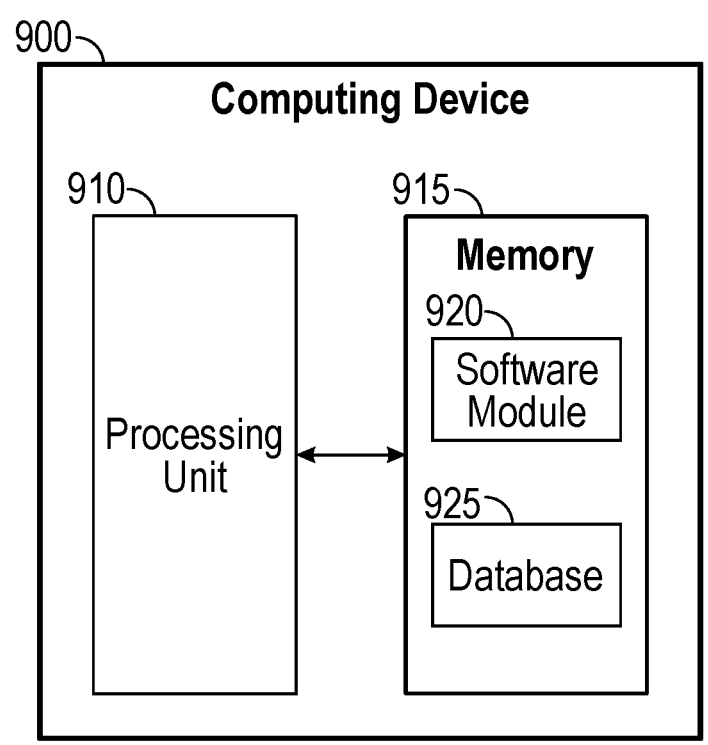
FIG. 9 shows a block diagram of a computer or computing device for conducting or executing the methods and processes for classifying content in an chat room session in accordance with aspects of the present disclosure.

FIG. 9 shows computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for determining prioritizing chat rooms and sending that information to a client, including for example, any one or more of the stages from method 700, method 732, or method 800 described above with respect to FIG. 7A-FIG. 8. Computing device 900, for example, may provide an operating environment for elements of operating environment 100 including, but not limited to, chat room server 105 and user device 155. Elements of operating environment 100 (e.g., chat room server 105 and user device 155) may operate in other environments and are not limited to computing device 900.

Computing device 900 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 900 may comprise any computer operating environment, such as hand-held devices, multi-processor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples and computing device 900 may comprise other systems or devices.

Accordingly, aspects of the present disclosure comprise a method comprising: receiving content for at least a first chat room and a second chat room; analyzing a characteristic, associated with the first chat room and the second chat room, against a user profile; determining that the first chat room is more applicable to the user; and based on the determination, providing a user interface to the user where the first chat room is prioritized over the second chat room.

Any of the one or more above aspects, wherein the characteristic is one of a mention of the user, a frequency of recent posts, a uploaded file, a number of participants, an amount of time between posts, a relationship between the user and a poster, and/or a presence of a keyword.

Any of the one or more above aspects, wherein the user profile determines a likelihood that the user will post a message to the chat room.

Any of the one or more above aspects, further comprising: waiting a period of time; and after the period of time, reanalyzing the characteristic.

Any of the one or more above aspects, wherein the user profile comprises an algorithm comprising the characteristic and a weight.

Any of the one or more above aspects, wherein the algorithm includes two or more characteristics.

Any of the one or more above aspects, further comprising: providing, on the user interface, a view of the user profile; receiving an input associated with the user interface; and based on the input, eliminating one of the two or more characteristics.

Any of the one or more above aspects, wherein the user profile is associated with a machine learning model, wherein developing the machine learning model comprises: for each chat room, parse the content associated with the chat room into two or more instances; for each instance, extract the characteristic; determine if a user posted a message during a first instance; if a user posted a message during the first instance, indicate user interest in the first instance; and based on the user interest in the first instance, weight the characteristic associated with the first instance.

Any of the one or more above aspects, wherein the two or more instances are parsed based on a read event of the user.

Any of the one or more above aspects, further comprising updating the machine learning model periodically based on new content in the two or more chat rooms.

Aspects of the present disclosure further comprise a non-transitory computer readable medium having stored thereon instructions which when executed by a processor, cause the processor to perform a method, the method comprising: receiving content for at least a first chat room and a second chat room; for each chat room, parse the content associated with the first chat room and the second chat room the first chat room and the second chat room into two or more instances; for each instance, extract two or more characteristics describing the instance; determine if a user posted a message during a first instance; if a user posted a message during the first instance, indicate user interest in the first instance; and based on the user interest in the first instance, create a user profile, wherein, in the user profile the two or more characteristics associated with the first instance more are weighted more.

Any of the one or more above aspects, further comprising: at a later time, analyzing a first characteristic, associated with the first chat room and the second chat room, against the user profile; determining that the first chat room is more applicable to the user; and based on the determination, providing a user interface to the user where the first chat room is prioritized over the second chat room.

Any of the one or more above aspects, wherein the two or more instances are parsed based on a read event of the user.

Any of the one or more above aspects, further comprising updating the machine learning model periodically based on new content in the two or more chat rooms.

Any of the one or more above aspects, further comprising: providing, on a user interface, a view of the user profile; receiving an input associated with the user interface; and based on the input, eliminating one of the two or more characteristics.

Aspects of the present disclosure further comprise a system comprising: a display that provides a user interface; a memory storage; a processing unit coupled to the memory storage and the display, wherein the processing unit to: provide, on the user interface, a prioritization of a first chat room over a second chat room, wherein the prioritization is based on a contemporaneous comparison of a characteristic, associated with the first chat room, to a user profile; receiving an input associated with the user interface; and based on the input, eliminating one of the two or more characteristics.

Any of the one or more above aspects, provide, on the user interface, a view of the user profile; receiving an input associated with the user interface; and based on the input, eliminating one of the two or more characteristics.

Any of the one or more above aspects, wherein the characteristic is one of a mention of the user, a frequency of recent posts, a uploaded file, a number of participants, an amount of time between posts, a relationship between the user and a poster, and/or a presence of a keyword.

Any of the one or more above aspects, wherein the input is received into a user-selectable device.

Any of the one or more above aspects, wherein the input is sent from the system to a chat room service to change the user profile.

Any of the one or more above aspects in combination with any of the other one or more above aspects.

Any of the one or more above aspects as described herein.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' steps or stages may be modified in any manner, including by reordering steps or stages and/or inserting or deleting steps or stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving content for at least a first chat room and a second chat room;
analyzing respective characteristics, associated with the first chat room and the second chat room, against a user profile, the user profile comprising a plurality of characteristics and an associated weight assigned to each of the plurality of characteristics;
determining that the first chat room is more applicable to the user than the second chat room, wherein determining that the first chat room is more applicable to the user than the second chat room comprises:
determining a score for each of the first chat room and the second chat room based on the respective characteristics associated with the first chat room and the second chat room and the plurality of characteristics and the associated weight assigned to each of the plurality of characteristics for the user profile, wherein determining the score for each of the first chat room and the second chat room comprises:

determining the respective characteristics associated with each of the first chat room and the second chat room from a predetermined period of time into the past from the current time, determining the associated weight for each of the respective characteristics associated with each of the first chat room and the second chat room by comparing the respective characteristics with the plurality of characteristics associated with the user profile, determining, for each of the first chat room and the second chat room, products of each of the respective characteristics and the associated weight assigned to each of the respective characteristics, and determining a sum of the products as the score for each of the first chat room and the second chat room, and determining that the first room is more applicable to the user based on the score; and based on determining that the first chat room is more applicable than the second chat room, providing a user interface to the user where the first chat room is prioritized over the second chat room.

2. The method of claim 1, wherein the respective characteristics comprises at least one of the following: a mention of the user, a frequency of recent posts, a uploaded file, a number of participants, an amount of time between posts, a relationship between the user and a poster, and a presence of a keyword.

3. The method of claim 1, wherein the user profile determines a likelihood that the user will post a message to the chat room.

4. The method of claim 1, further comprising:
waiting a period of time; and
after the period of time, reanalyzing the respective characteristics.

5. The method of claim 1, further comprising:
providing, on the user interface, a view of the user profile;
receiving an input associated with the user interface; and
based on the input, eliminating one of the plurality of characteristics.

6. The method of claim 1, wherein the user profile is associated with a machine learning model, wherein developing the machine learning model comprises:
for each chat room, parse the content associated with the chat room into two or more instances;
for each instance, extract a characteristic;
determine if a user posted a message during a first instance;
if a user posted a message during the first instance, indicate user interest in the first instance; and
based on the user interest in the first instance, weight the characteristic associated with the first instance.

7. The method of claim 6, wherein the two or more instances are parsed based on a read event of the user.

8. The method of claim 7, further comprising updating the machine learning model periodically based on new content in the two or more chat rooms.

9. A non-transitory computer readable medium having stored thereon instructions which when executed by a processor, cause the processor to perform a method, the method comprising:
receiving content for at least a first chat room and a second chat room;

for each chat room, parsing the content associated with the first chat room and the second chat room into two or more instances;
for each instance, extracting two or more characteristics describing the instance;
determining if a user posted a message during a first instance;
if a user posted a message during the first instance, indicating user interest in the first instance;
based on the user interest in the first instance, creating a user profile comprising a plurality of characteristics of the two or more characteristics, wherein the user profile further comprises an associated weight assigned to each of the plurality of characteristics;
determining that the first chat room is more applicable to the user than the second chat room, wherein determining that the first chat room is more applicable to the user than the second chat room comprises:
determining a score for each of the first chat room and the second chat room based on respective characteristics associated with the first chat room and the second chat room and the plurality of characteristics and the associated weight assigned to each of the plurality of characteristics for the user profile, wherein determining the score for each of the first chat room and the second chat room comprises:
determining the respective characteristics associated with each of the first chat room and the second chat room from a predetermined period of time into the past from the current time,
determining the associated weight for each of the respective characteristics associated with each of the first chat room and the second chat room by comparing the respective characteristics with the plurality of characteristics associated with the user profile,
determining, for each of the first chat room and the second chat room, products of each of the respective characteristics and the associated weight assigned to each of the respective characteristics, and
determining a sum of the products as the score for each of the first chat room and the second chat room, and
determining that the first room is more applicable to the user based on the score; and
providing, based on determining that the first chat room is more applicable to the user than the second chat room, a user interface to the user where the first chat room is prioritized over the second chat room.

10. The non-transitory computer readable medium of claim 9, further comprising:
at a later time, analyzing a first characteristic, associated with the first chat room and the second chat room, against the user profile.

11. The non-transitory computer readable medium of claim 9, wherein the two or more instances are parsed based on a post event of the user.

12. The non-transitory computer readable medium of claim 11, further comprising updating a machine learning model periodically based on new content in the two or more chat rooms.

13. The non-transitory computer readable medium of claim 12, further comprising:
providing, on a user interface, a view of the user profile;
receiving an input associated with the user interface; and based on the input, eliminating one of the plurality of characteristics.

14. A system comprising:
a display that provides a user interface;
a memory storage;
a processing unit coupled to the memory storage and the display, wherein the processing unit is operative to:
provide, on the user interface, a prioritization of a first chat room over a second chat room, wherein the prioritization is based on a contemporaneous comparison of respective characteristics, associated with the first chat room, to a user profile comprising a plurality of characteristics and an associated weight assigned to each of the plurality of characteristics, wherein the processing unit being operative to provide the prioritization of the first chat room over the second chat room comprises the processing unit being operative to:
determine a score for each of the first chat room and the second chat room on the respective characteristics associated with the first chat room and the second chat room and the plurality of characteristics and the associated weight assigned to each of the plurality of characteristics for the user profile, wherein the processing unit being operative to determine the score for each of the first chat room and the second chat room comprises the processing unit being operative to:
determining the respective characteristics associated with each of the first chat room and the second chat room from a predetermined period of time into the past from the current time,
determining the associated weight for each of the respective characteristics associated with each of the first chat room and the second chat room by comparing the respective characteristics with the plurality of characteristics associated with the user profile,
determine, for each of the first chat room and the second chat room, products of each of the respective characteristics and the associated weight assigned to each of the respective characteristics, and
determine a sum of the products as the score for each of the first chat room and the second chat room, and
determine that the first room is more applicable to the user over the second chat room based on the score;
receiving an input associated with the user interface to select the first chat room; and
based on the input, providing content from the first chat room.

15. The system of claim 14, wherein the processing unit is further configured to:
provide, on the user interface, a view of the user profile;
receiving an input associated with the user interface; and
based on the input, eliminating one of the plurality of characteristics.

16. The system of claim 15, wherein the respective characteristics comprises at least one of the following: a mention of the user, a frequency of recent posts, a uploaded file, a number of participants, an amount of time between posts, a relationship between the user and a poster, and a presence of a keyword.

17. The system of claim 15, wherein the input is received into a user-selectable device.

18. The system of claim 17, wherein the input is sent from the system to a chat room service to change the user profile.

19. The system of claim 17, wherein the processing unit is further operative to:
wait a period of time; and
after the period of time, reanalyze the respective characteristics.

20. The system of claim 14, wherein the associated weight is determined based on statistical analysis of historical data associated with the first chat room and the second chat room.

* * * * *